US009970550B2

(12) United States Patent
Banowetz et al.

(10) Patent No.: US 9,970,550 B2
(45) Date of Patent: May 15, 2018

(54) UNITARY FACE SEAL ASSEMBLY

(71) Applicant: Engineered Seal Products, Inc., Cedar Rapids, IA (US)

(72) Inventors: Matt Banowetz, Cedar Rapids, IA (US); Mark Reimer, Coralville, IA (US)

(73) Assignee: Engineered Seal Products, Inc., Cedar Rapids, IA (US)

( * ) Notice: Subject to any disclaimer, the term of this patent is extended or adjusted under 35 U.S.C. 154(b) by 811 days.

(21) Appl. No.: 14/483,640

(22) Filed: Sep. 11, 2014

(65) Prior Publication Data
US 2016/0076652 A1   Mar. 17, 2016

(51) Int. Cl.
*F16J 15/16* (2006.01)
*F16J 15/34* (2006.01)

(52) U.S. Cl.
CPC ........... *F16J 15/344* (2013.01); *F16J 15/348* (2013.01)

(58) Field of Classification Search
CPC ....... F16J 15/3436; F16J 15/344; F16J 15/348
See application file for complete search history.

(56) References Cited

U.S. PATENT DOCUMENTS

| 2,590,759 | A | * | 3/1952 | Dale | F16J 15/344 |
| | | | | | 277/387 |
| 4,421,327 | A | * | 12/1983 | Morley | F16J 15/344 |
| | | | | | 277/381 |
| 7,887,061 | B2 | | 2/2011 | Van Dyke et al. | |
| 2010/0148448 | A1 | * | 6/2010 | Pinto | B22F 5/106 |
| | | | | | 277/371 |

* cited by examiner

*Primary Examiner* — Gilbert Y Lee
(74) *Attorney, Agent, or Firm* — Shuttleworth & Ingersoll, PLC; Jason Sytsma

(57) ABSTRACT

A metal face seal assembly includes a casing with a first portion that rotates with respect to a second portion. Inside the casing is a face seal assembly with a first seal member that has a first sealing face that rotates with respect to a second seal member that has a second sealing face. At least one loader is provided that is compressible against the casing and exerts a biasing force against one of the first seal member and the second seal member to bias together the first seal face of the first seal member and the second seal face of the second seal member. The first portion and the second portion can each terminate with an annular ring that are separated by a gap for an installation ring positioned in the gap that is removable after installation of the metal face seal assembly.

19 Claims, 3 Drawing Sheets

UNITARY FACE SEAL ASSEMBLY

BACKGROUND

The present disclosure relates generally to face seals, and more specifically, it relates to a unitary face seal set.

A wide variety of seals for use in machine systems have been developed over the years. Seals are commonly used to retain lubricating fluid, such as oil or grease, within fluid cavities of machine system components. Where the machine system components are rotatable relative to one another, relatively sophisticated seal designs may be used to provide a fluid seal at a rotatable interface. One seal design which has seen much commercial success over the years is known in the art as a metal face seal. Metal face seals typically include inner seal members or "seal rings," which are each coupled with a separate machine component. The seal rings have abutting metal faces, which can rotate relative to one another while sealing lubricating fluid within and/or among the associated machine components with minimal leakage.

SUMMARY

A metal face seal assembly is provided that includes a casing with a first portion that rotates with respect to a second portion. Inside the casing is a face seal assembly with a first seal member that has a first sealing face that rotates with respect to a second seal member that has a second sealing face. At least one loader is provided that is compressible against the casing and exerts a biasing force against one of the first seal member and the second seal member to bias together the first seal face of the first seal member and the second seal face of the second seal member. The first portion and the second portion can each terminate with an annular ring that are separated by a gap for an installation ring positioned in the gap that is removable after installation of the metal face seal assembly.

One or both of the first portion of the casing and the second portion of the casing can have an angled surface with the loader(s) positioned between the angled surface and the face seal assembly. The first portion and the second portion are combined at an assembled area that allows the first portion of the casing to rotate with respect to the second portion of the casing. The assembled area includes a portion of the second portion of the casing folded over a portion of the first portion of the casing to hold the first portion of the casing relative in an axial direction to the second portion of the casing.

A for sealing an intersection of a housing and a shaft is also disclosed. The method comprises providing at the intersection of the housing and the shaft a metal face seal assembly. The assembly has a casing with a first portion that rotates with respect to a second portion. A face seal assembly inside the casing and has a first seal member with a first sealing face and a second seal member with a second sealing face and a loader that is compressible against the casing exerts a biasing force against one of the first seal member and the second seal member to bias together the first seal face of the first seal member and the second seal face of the second seal member. The method continues with providing an installation ring for holding the first portion of the casing with respect to the second portion of the casing. The method continues with creating an assembled area between the first portion of the casing and the second portion of the casing that allows the first portion of the casing to rotate with respect to the second portion of the casing. The method also includes removing the installation ring to reveal a gap between the first portion of the casing and the second portion of the casing that leads to a cavity of the casing.

Various other objects, features and attendant advantages of the present invention will become fully appreciated as the same becomes better understood when considered in conjunction with the accompanying drawings, in which like reference characters designate the same or similar parts throughout the several views.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
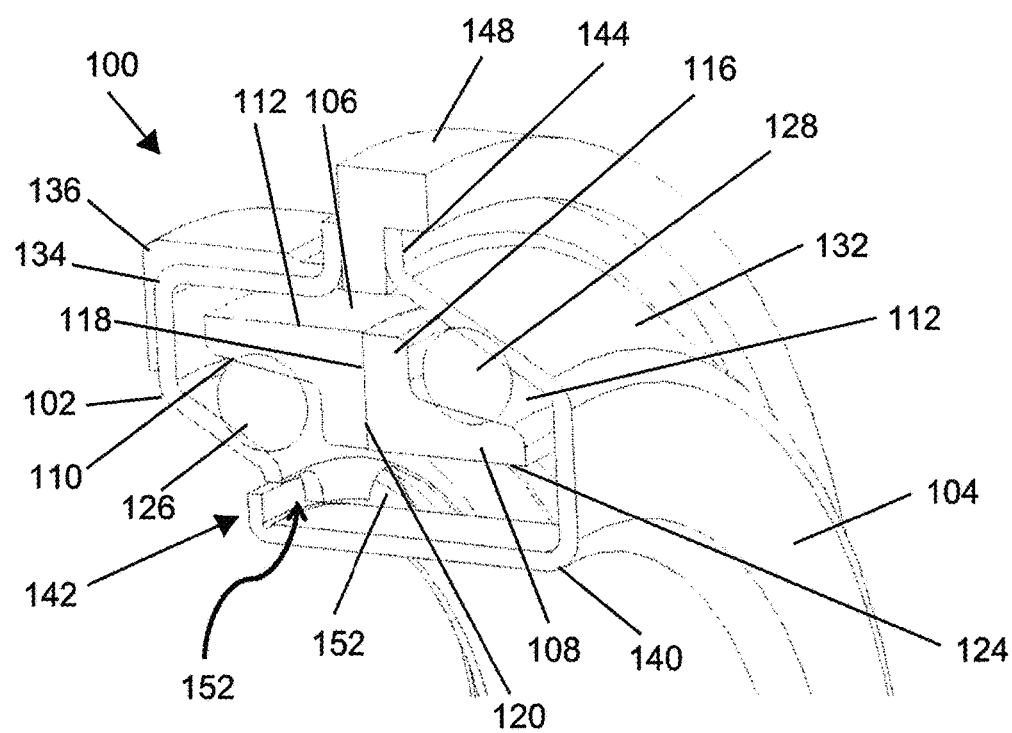
FIG. 1 is a perspective view of a unitary face seal assembly in accordance with one implementation of the present disclosure.
Figure 2:
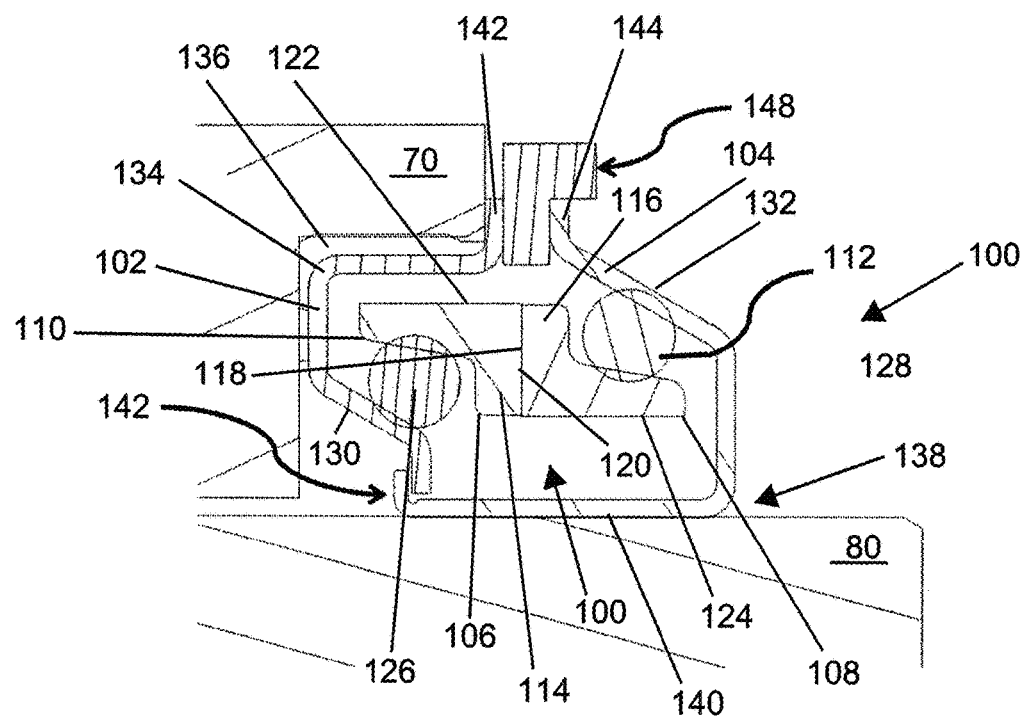
FIG. 2 is a front facing sectional view of the unitary face seal assembly of FIG. 1.
Figure 3:
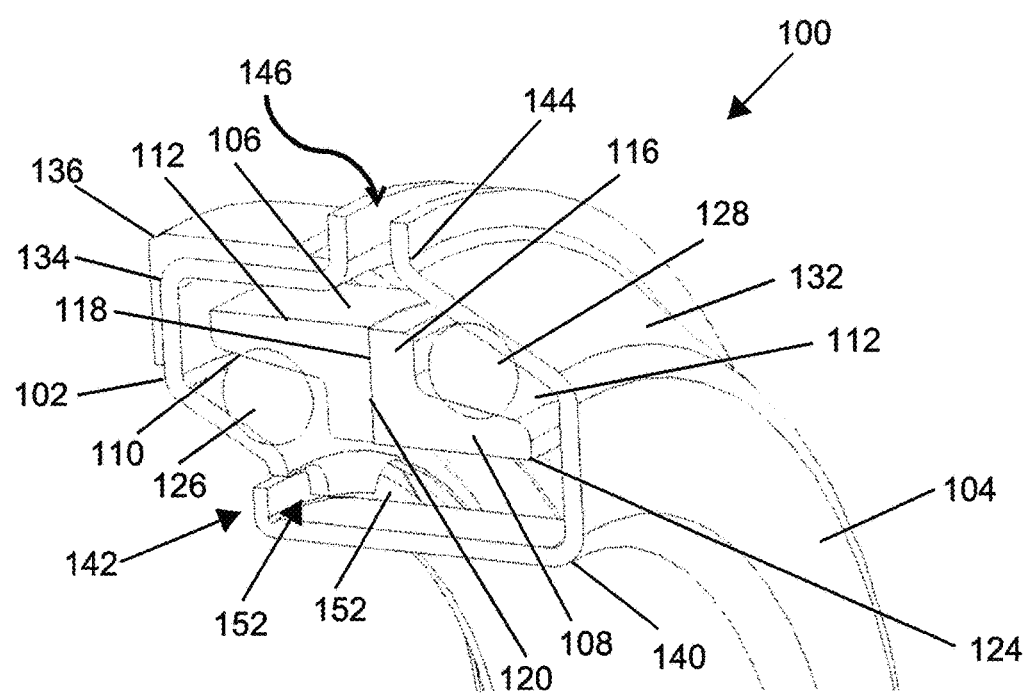
FIG. 3 is a perspective view of the unitary face seal assembly of FIG. 1 with the installation ring removed.

FIGS. 1 through 3 show a metal face seal assembly 100 in accordance with one implementation of the present disclosure. Assembly 100 includes a casing with a first portion 102 and a second portion 104 that rotates with respect to first portion 102. FIG. 2 shows first portion 102 press-fitted into a machine bore 70 and second portion 104 press-fitted onto a shaft 80. Either bore 70 or shaft 80 can rotate so that either one rotates with respect to the other with assembly 100 providing the barrier for fluidly sealing bore 70 and shaft 80. Assembly 100 is a unitary element that houses two metal face seals in a single casing. Assembly 100 can replace a rubber seal to provide the durability of a metal face seal with the ease of installation of a rubber seal.

The casing includes a first portion 102 with an angled surface 130 that positions a first loader 126 against a first seal member 106 (discussed below). The casing also includes a second portion 104 with angled surface 132 that positions a second loader 128 against a second seal member 108 (discussed below). First portion 102 of casing further includes an elbow portion 134 sized to fit into bore 70, and can include a polymer sleeve 136 surrounding elbow portion 134 to make assembly 100 easier to install in bore 70. Second portion 104 of casing has an elbow portion 138 with a substantially flat face 140 to fit on to shaft 80, and can include a polymer sleeve to make assembly 100 easier to install on shaft 80. The opposite end of face 140 is turned upward after installation by crimping to form an assembled area 142 that holds assembly 100 together to prevent second seal member 108 from moving horizontally or axially with respect to first seal member 106 before, during, and after installation while simultaneously allowing first seal member 106 to rotate with respect to second seal member 108.

First seal member 106 and second seal member 108 of the casing each include an annular ring 143 and 144, respectively, separated by a gap 146 (shown in FIG. 3). An installation ring 148 is positioned in gap 146 to maintain the distance between each annular ring 143 and 144 during the installation process. After installation, installation ring 148 can be removed revealing gap 146 that provides a pathway for dirt and debris to exit the inside area of assembly 100 during its operation as well as providing the correct interference to the loaders. Installation ring 148 may be, but not limited to, a rubber or plastic material that is easily removed and disposable. Ring 148 has a stepped profile to locate it in place radially while the width of the step, which is greater than the axial play in the assembly 100, prevents ring 148 from falling out. Installation ring 148 may also be split so it can more easily be removed.

Assembly 100 includes a first seal member 106 and a second seal member 108 that can be made from metal. Each first seal member 106 and second seal member 108 may have an outer diameter 110 and 112, respectively, positioned radially apart from a base 122 and 124, respectively, and an annular shoulder 114 and 116, respectively, that extends from base 122 and 124, respectively, to the top of annular shoulder 114 and 116, respectively.

Each first seal member 106 and second seal member 108 has a sealing face, first sealing face 118 and second sealing face 120, respectively, that may extend all or a portion of the thickness of first seal member 106 and second seal member 108 (measured from base 122, 124 to top of shoulder 114, 116, respectively). Each first sealing face 118 and second sealing face 120 can have a metallic surface to form a metal face seal. First seal member 106 and second seal member 108 are flipped with respect to each other with base 122 of first seal member 106 positioned radially away from base 124 of second seal member 108, although they could be coplanar. By orienting first seal member 106 and second seal member 108 in opposite positions, a first loader 126 and a second loader 128 (discussed below) are positioned to exert a maximum biasing force against first seal member 106 and second seal member 108, respectively, to press first sealing face 118 against second sealing face 120 at the intersection where the two portions of assembly 100 interact. Loaders 126 and 128 angled surfaces 130 and 132, respectively. The position may be modified for each application to get the appropriate loading.

Assembly 100 includes first loader 126 and second loader 128. Each first loader 126 and second loader 128 may comprise wholly of a compressible non-metallic material such as an elastomeric material having a circular cross-sectional shape as shown. Each first loader 126 and second loader 128 may comprise alternative cross sectional shapes, such as a D-shaped, elliptical or oval cross-sectional shape, and might also be partially metallic.

Each first loader 126 and second loader 128 is positioned to engage outer diameter 110 and 112 of first seal member 106 and second seal member 108, respectively, and exert a biasing force that urges first sealing face 118 against second sealing face 120. The casing of assembly 100 is configured to position angled surface 130 of first seal member 106 of the casing to compress first loader 126 against first seal member 106 and position angled surface 132 of second seal member 108 of the casing to compress second loader 128 against second seal member 108. Such a configuration enables first loader 126 and second loader 128 to exert a biasing force against first seal member 106 and second seal member 108, respectively, to press first sealing face 118 against second sealing face 120 at the intersection where the two portions of assembly 100 interact.

During operation, first sealing face 118 and second sealing face 120 will rotate against one another, maintaining lubricating fluid with a cavity 150 of the casing. Spaces 156 can be added at the end of first portion 102 of the casing (see FIGS. 1 and 2). These spaces 156 form a lubrication pathway for lubricating fluid to flow in assembly 100. The lubricating fluid may or may not be needed for lubrication in assembly 100, and the lubrication pathway allows for entrance of fluid into assembly 100.

The foregoing description describes assembly 100 as a unitary element that can replace a rubber seal to provide the durability of a metal face seal with the ease of installation of a rubber seal. Assembly 100 provides the barrier for fluidly sealing bore 70 and shaft 80. Either bore 70 or shaft 80 can rotate so that either one rotates with respect to the other. Moreover, either first seal member 106 of the casing or second seal member 108 of the casing can be stationary and the other rotates.

To those skilled in the art to which this invention relates, many changes in construction and widely differing embodiments and applications of the invention can suggest themselves without departing from the spirit and scope of the invention. The disclosures and the descriptions herein are purely illustrative and are not intended to be in any sense limiting. Various aspects of the different embodiments can be combined in different combinations to create new embodiments within the scope of the invention.

What is claimed is:

1. A metal face seal assembly comprising
a casing having a first portion and a second portion, wherein the first portion rotates with, respect to the second portion;
a face seal assembly inside the casing and having first seal member with a first sealing face and a second seal member with a second sealing face, wherein the first seal member rotates with respect to the second seal member,
at least one loader compressible against the casing and exerting a biasing force against one of the first seal member and the second seal member to bias together the first seal face of the first seal member and the second seal face of the second seal member; and
an installation ring for holding the first portion of the casing with respect to the second portion of the casing, wherein after the casing is installed the installation ring is removed to reveal a gap between the first portion of the casing and the second portion of the casing that leads to a cavity of the casing.

2. The metal face seal assembly of claim 1, and further comprising an angled surface on one of the first portion and the second portion of the casing, wherein the loader is positioned between the angled surface and the face seal assembly.

3. The metal face seal assembly of claim 2, and further comprising an assembled area for combining together the first portion of the casing and the second portion of the casing while simultaneously allowing the first portion of the casing to rotate with respect to the second portion of the casing.

4. The metal face seal assembly of claim 3, wherein the assembled area includes a portion of the second portion of the casing folded over a portion of the first portion of the casing to hold the first portion of the casing relative in an axial direction to the second portion of the casing.

5. The metal face seal assembly of claim 1, and further comprising two loaders each being compressible against the casing and exerting a biasing force on one of the first seal member and the second seal member to bias together the first sealing face of the first seal ember and the second sealing face of the second seal member.

6. The metal face seal of claim 5, and further comprising an angled surface on each one of the first portion and the second portion of the casing, wherein one of the two loaders is positioned between the angled surface on the first portion of the casing and the first seal member and the other one of the two loaders is positioned between the angled surface on the second portion of the casing and the second seal member.

7. The metal face seal of claim 1, wherein the first sealing face and the second sealing face have a metallic surface.

8. The metal face seal of claim 1, wherein the first seal member and the second seal member each have a shoulder extending away from a base, and wherein the first seal member and the second seal member are oriented with respect to each other so that the base of the first seal member is radially away from the base of the second seal member.

9. A metal face seal assembly comprising
   a casing having a first portion terminating with an annular ring and a second portion terminating with an annular ring, wherein the first portion rotates with respect to the second portion, and the annular ring of the first portion and the annular ring of the second portion are separated by a gap;
   an installation ring positioned in the gap that is removable after installation of the metal face seal assembly;
   a face seal assembly inside the casing and having first seal member with a first sealing face and a second seal member with a second sealing face, wherein the first seal member rotates with respect to the second seal member; and
   at least one loader compressible against the casing and exerting a biasing force against one of the first seal member and the second seal member to bias together the first seal face of the first seal member and the second seal face of the second seal member.

10. The metal face seal assembly of claim 9, and further comprising an angled surface on one of the first portion and the second portion of the casing, wherein the loader is positioned between the angled surface and the face seal assembly.

11. The metal face seal assembly of claim 9, and further comprising an assembled area for combining together the first portion of the casing and the second portion of the casing while simultaneously allowing the first portion of the casing to rotate with respect to the second portion of the casing.

12. The metal face seal assembly of claim 11, wherein the assembled area includes a portion of the second portion of the casing folded over a portion of the first portion of the casing to hold the first portion of the casing relative in an axial direction to the second portion of the casing.

13. The metal face seal assembly of claim 9, and further comprising two loaders each being compressible against the casing and exerting a biasing force on one of the first seal member and the second seal member to bias together the first sealing face of the first seal member and the second sealing face of the second seal member.

14. The metal face seal of claim 13, and further comprising an angled surface on each one of the first portion and the second portion of the casing, wherein one of the two loaders is positioned between the angled surface on the first portion of the casing and the first seal member and the other one of the two loaders is positioned between the angled surface on the second portion of the casing and the second seal member.

15. A method for sealing an intersection of a housing and a shaft, the method comprising:
   providing at the intersection of the housing and the shaft a metal face seal assembly having a casing having a first portion and a second portion, wherein the first portion rotates with respect to the second portion, a face seal assembly inside the casing and having first seal member with a first sealing face and a second seal member with a second sealing face, wherein the first seal member rotates with respect to the second seal member, and at least one loader compressible against the casing and exerting a biasing force against one of the first seal member and the second seal member to bias together the first seal face of the first seal member and the second seal face of the second seal member;
   providing an installation ring for holding the first portion of the casing with respect to the second portion of the casing;
   creating an assembled area between the first portion of the casing and the second portion of the casing that allows the first portion of the casing to rotate with respect to the second portion of the casing; and
   removing the installation ring to reveal a gap between the first portion of the casing and the second portion of the casing that leads to a cavity of the casing.

16. The method of claim 15, comprising providing the metal face seal assembly with two loaders each being compressible against the casing and exerting a biasing force on one of the first seal member and the second seal member to bias together the first sealing face of the first seal member and the second sealing face of the second seal member.

17. The method of claim 16, providing the metal face seal assembly with an angled surface on each one of the first portion and the second portion of the casing, wherein one of the two loaders is positioned between the angled surface on the first portion of the casing and the first seal member and the other one of the two loaders is positioned between the angled surface on the second portion of the casing and the second seal member.

18. The method of claim 16, rotating the shaft with respect to the housing.

19. The method of claim 18, biasing together the first sealing face of the first seal member and the second sealing face of the second seal member.

* * * * *